United States Patent

Worthing

[11] Patent Number: 5,490,641
[45] Date of Patent: Feb. 13, 1996

[54] VEGETATION CUTTERS

[75] Inventor: John Worthing, Birtley, United Kingdom

[73] Assignee: Black & Decker Inc., Newark, Del.

[21] Appl. No.: 281,383

[22] Filed: Jul. 27, 1994

[30] Foreign Application Priority Data

Jul. 28, 1993 [GB] United Kingdom .............. 9315594

[51] Int. Cl.⁶ .......................... B65H 18/00; B65H 75/02
[52] U.S. Cl. ................................................ 242/587; 30/276
[58] Field of Search ................... 30/276, 347; 56/12.7, 56/16.9, 295; 242/19, 125.1, 25 R, 125.1, 587, 580, 579, 587.2

[56] References Cited

U.S. PATENT DOCUMENTS

| | | | |
|---|---|---|---|
| 4,020,552 | 5/1977 | Mizuno et al. | 30/276 |
| 4,091,538 | 5/1978 | Akiyama | 30/276 |
| 4,134,204 | 1/1979 | Perdue | 30/276 |
| 4,168,572 | 9/1979 | Ewing | 30/276 |
| 4,194,287 | 3/1980 | Palmieri et al. | 30/276 |

FOREIGN PATENT DOCUMENTS

| | | |
|---|---|---|
| 0515908 | 5/1992 | European Pat. Off. . |
| 2377758 | 6/1977 | France . |
| 2559343 | 2/1985 | France . |
| 1576172 | 10/1980 | United Kingdom . |
| 1582568 | 1/1981 | United Kingdom . |

*Primary Examiner*—Hwei-Siu Payer
*Attorney, Agent, or Firm*—Charles E. Yocum; Frederick H. Voss; Dennis A. Dearing

[57] ABSTRACT

A spool (30) for a rotary cutter, such as a lawn mower edger or trimmer of the type using a flexible line (38) as a cutting member, comprises a core portion (32) and at least two flange portions (34), (36) spaced apart on the core portion (32) for supporting at least one coil of flexible line (38). At least one coiled line member (38) is disposed about the core portion (32) and has a first end (40) secured to the spool (30) and a second end (42) adapted to extend from the coiled line (38) to provide a length of line (12) for cutting. At least one of the flange portions (34) is provided with two apertures (44), (46), through which the line (38) can be threaded, at least one (44) of these apertures being in communication radially with the outside (50) of the flange (34) so that the line (38) can enter the aperture from a position radially exterior of the flange (34), and the line (38) is coiled with said first end (40) threaded through aperture (46) from the outside (52) of the spool (30) in a direction substantially parallel to the axis (A) of the spool (30), so that the end (40) is retained close to the core portion (32) of the spool (30), and then threaded through the communicating aperture (44) in the direction (X) of winding of the line (38).

The aperture (44 which is in communication radially with the outside (50) of the flange (34) is preferably L-shaped.

10 Claims, 2 Drawing Sheets

VEGETATION CUTTERS

BACKGROUND TO THE INVENTION

This invention relates to vegetation cutters and has particular reference to cutters that cut by means of a filament or strip that is rotated rapidly about an axis that may be either substantially vertical or substantially horizontal, depending upon the application.

In most filament cutters, the cutting filament or strip is stored on a spool or reel from which a cutting length extends. During use, wear on the cutting length shortens that length, and it is then necessary to withdraw filament or strip from the spool to make up the cutting length to its working value. The filament cutter is supplied with a reel or spool on which a supply of filament or strip is stored.

In general, when the supply of filament or strip on a reel or spool is exhausted, the empty reel or spool is removed and a replacement reel or spool, with a new supply of filament or strip already loaded is fitted. This is a simple operation, which is carried out by the operator of the vegetation cutter. The replacement reels or spools are readily available from the usual retail sources, including for example, retailers of the vegetation cutter itself.

The cutting filament or strip is a flexible, generally non-metallic filament or strip, in particular a light weight plastic filament or strip, having a relatively small diameter, which is adapted to cut or trim grass or other lightweight vegetation with reasonable effectiveness, and which is unlikely to cause significant injury to persons or animals struck by the flailing filament or strip.

During manufacture of the reel or spool with the supply of cutting filament or strip wound on it, the cutting filament or strip has to be wound onto the empty reel or spool, either manually or automatically. As the winding of a length of cutting filament or strip is commenced, it is necessary for the free end of the filament or strip to be secured, at least temporarily, to the reel or spool before the winding operation can be commenced.

As the filament cutter is used, and the supply of filament or strip becomes exhausted, a relatively short length of filament is eventually left on the spool. If the end of this short length, which is of course the free end referred to in the preceding paragraph, is not secured to the spool, then there is a danger that a length of filament or strip, which might be of a similar length to the cutting length, or may be even longer, may fly off from the cutter head, giving the risk of injury to the operator.

A number of proposals have been made to provide a means of securing the filament or strip to the reel or spool for winding, but none of these is entirely satisfactory. It has been proposed, to locate the free end of the thermoplastic line in an aperture in the spool wall, and optionally to deform the free end by heating, so that it is retained within the spool. This method has the disadvantages firstly that it requires the provision of a heating element at the winding station, and also may lead to environmental and safety issues associated with the heating of plastics materials and secondly that the final section of line is not retained on exhaustion. In GB 1,576,172 it was proposed to thread the cutting line through an aperture in the spool wall and then to secure it by knotting, which involves an inconvenient mechanical operation; an alternative proposal in the same specification suggests that the line can be embedded in the spool wall, but no details are given of this proposal.

It has also been proposed to provide two closed apertures in one flange of the spool and to feed the end of the line through each of these apertures prior to commencing winding. While effective, this proposal has the disadvantage that the initial feeding of the line into the apertures prior to winding must be carried out in the opposite sense to the winding, and therefore constitutes an additional operation in the winding process, adding to the manufacturing costs.

UK Patent No. 1,582,568 discloses a filament cutter in which the filament is stored on a disk having a series of apertures circumferentially therearound, with a length of filament fixed to the disk and having a terminal length thereof extending from one of said apertures as a cutting length of the filament. Successive apertures define intermediate portions of filament which themselves become terminal lengths as the line is consumed.

BRIEF SUMMARY OF THE INVENTION

It is an object of the present invention to provide a spool for a vegetation cutter in which the above disadvantages are reduced or substantially obviated. It is a further object of the present invention to provide a method of winding such a spool, and a vegetation cutter comprising such a spool.

The present invention provides a spool for a rotary cutter, such as a lawn mower, edger or trimmer of the type using a flexible line as a cutting member, which spool comprises a core portion and at least two flange portions spaced apart on the core portion for supporting at least one coil of flexible line, and at least one coiled line member disposed about the core portion and having a first end secured to the spool and a second end adapted to extend from the coiled line to provide a length of line for cutting, wherein at least one of the flange portions is provided with at least two apertures, through which the line can be threaded, at least one of these apertures being in communication radially with the outside of the flange so that the line can enter said communicating aperture from a position radially exterior of the flange, and the line is coiled with said first end threaded through said aperture from the outside of the spool in a direction substantially parallel to the axis of the spool, so that the end is retained close to the core portion of the spool, and then threaded through said communicating aperture in the direction of winding of the line.

The invention further provides a rotary cutter, such as a lawn mower edger or trimmer of the type using a flexible line as a cutting member, which comprises a spool which comprises a core portion and at least two flange portions spaced apart on the core portion for supporting at least one coil of flexible line, and at least one coiled line member disposed about the core portion and having a first end secured to the spool and a second end adapted to extend from the coiled line to provide a length of line for cutting, wherein at least one of the flange portions is provided with at least two apertures through which the line can be threaded, at least one of these apertures being in communication radially with the outside of the flange so that the line can enter said communicating aperture from a position radially exterior of the flange, and the line is coiled with said first end threaded through said other aperture from the outside of the spool in a direction substantially parallel to the axis of the spool, so that the end is retained close to the core portion of the spool, and then threaded through said communicating aperture in the direction of winding of the line.

The invention further provides a method of winding line on a spool wherein the spool comprises a core portion and at least two flange portions spaced apart on the core portion for supporting at least one coil of flexible line, wherein at least one of the flange portions is provided with at least two apertures, through which the line can be threaded, at least one of these apertures being in communication radially with the outside of the flange and a first end of the line is threaded through said other aperture from the outside of the spool in a direction substantially parallel to the axis of the spool, so that said end is retained close to the core portion of the spool, the line is then threaded through said communicating aperture in the direction of winding of the line and the line is then wound on the spool.

In a preferred embodiment of a spool according to the invention, the aperture which is in communication with the outside of the flange is substantially L-shaped, with the base of the "L" extending approximately at right angles to the radius of the spool, in the direction in which the line is to be wound on the spool Where the aperture is of the preferred L-shaped configuration, this has the further advantage that this indicates to the operator of the spool winding equipment, the direction in which the line is to be wound.

BRIEF DESCRIPTION OF THE DRAWINGS

An embodiment of a spool according to the invention will now be further described with reference to the accompanying drawings, in which

FIG. 4 is a schematic view of the spool of FIG. 3 showing the direction of winding of the cutting filament at the start of the winding operation.

DETAILED DESCRIPTION

Figure 1:
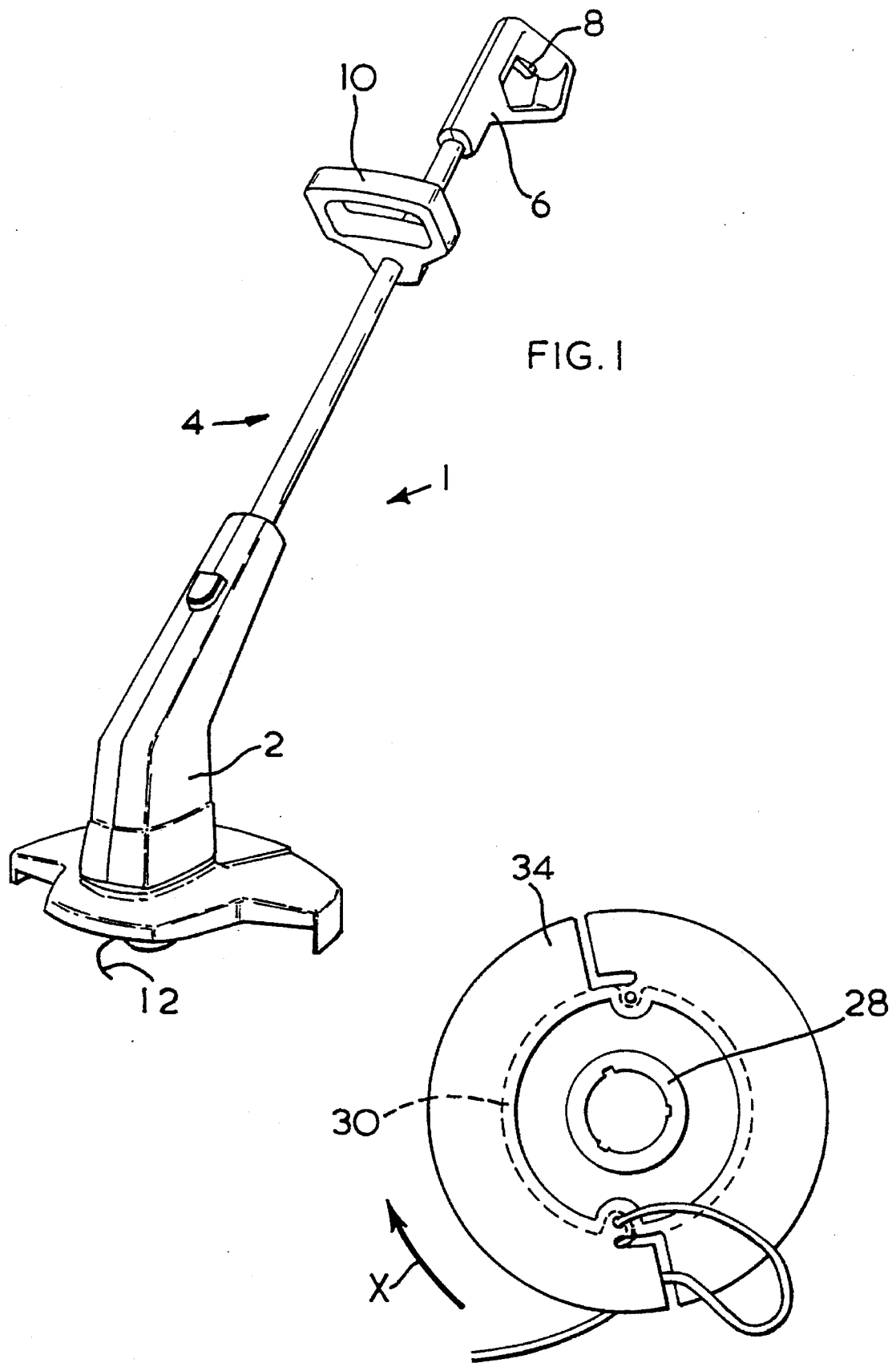
FIG. 1 is a general view of a string trimmer.

Referring to FIG. 1, there is shown an apparatus according to the invention for cutting vegetation. The apparatus comprises a grass trimmer (1) which has a lower housing (2) connected by a shaft (4) to a handle assembly (6). The handle assembly (6) provides a switch (8) for selectively or supplying electrical power to an electric motor (not shown) carried within the housing (2). For two-handed operation of the trimmer, a secondary handle (10) is mounted on the shaft (4). The lower housing (2) carries a cutting head (not shown), rotatable about an axis passing through the housing (2) and the cutting line (12) extends into a cutting plane which is substantially perpendicular to the axis of rotation of the lead.

Figure 2:
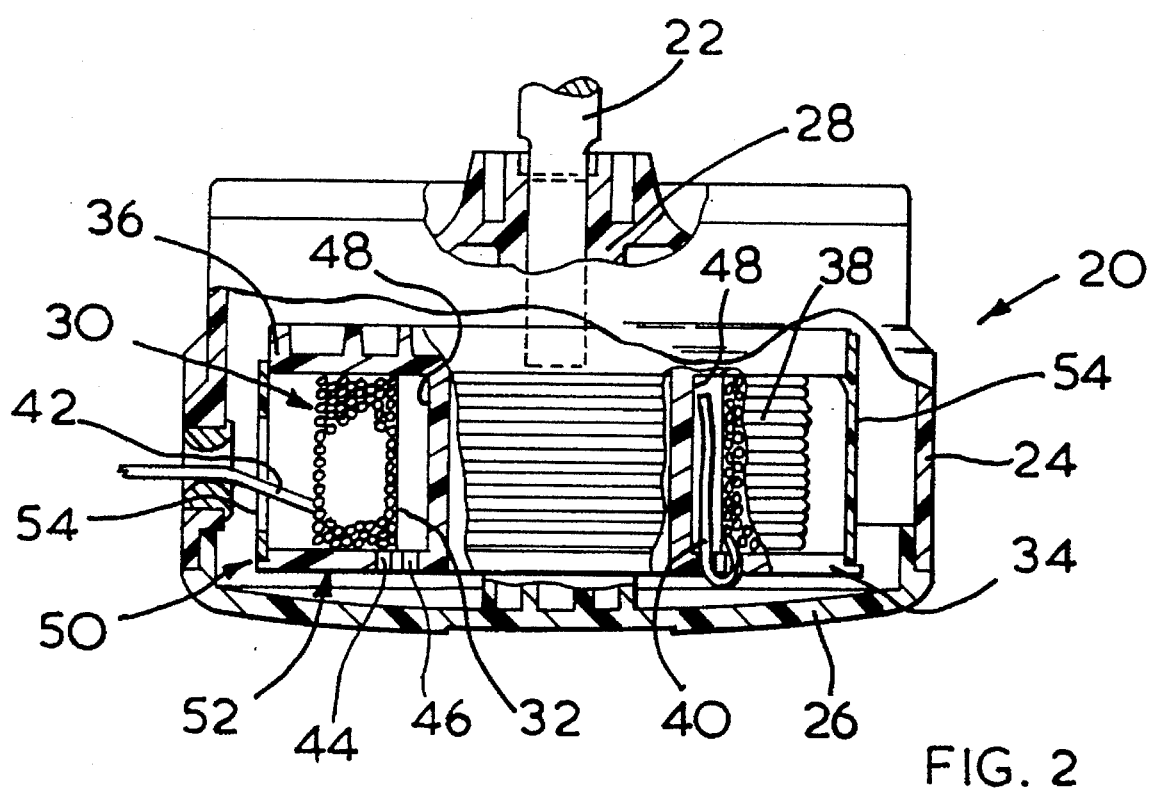
FIG. 2 is a section of a spool assembly.
Figure 3:
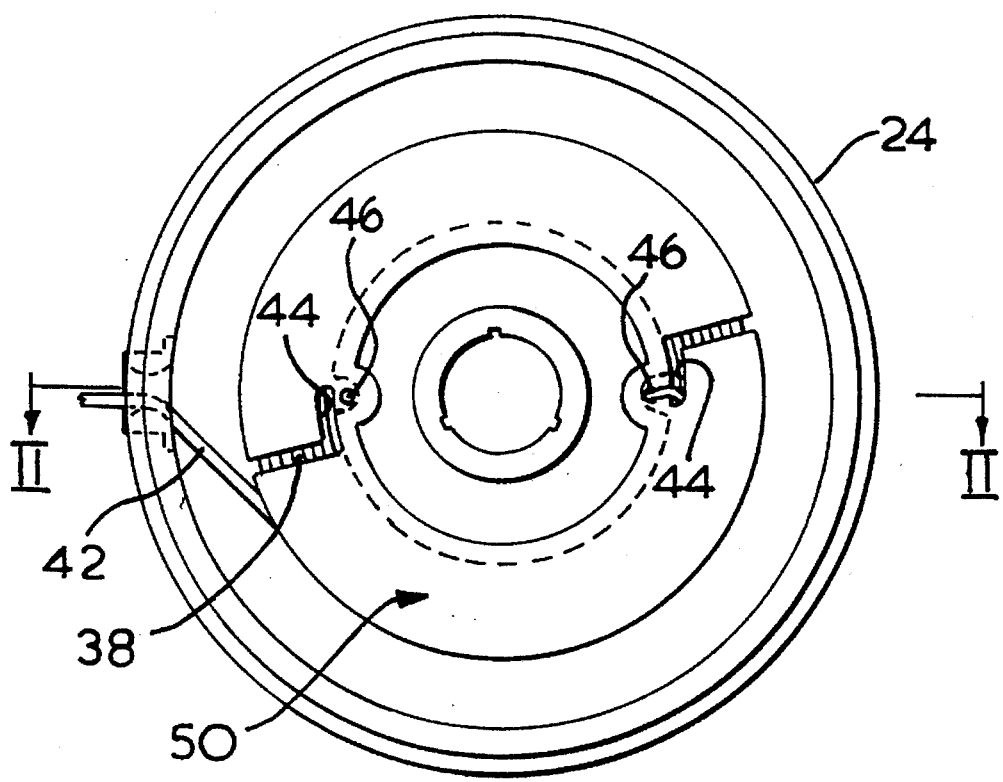
FIG. 3 is a plan view of an embodiment a spool according to the invention.

In FIG. 2, there is shown [in section] a cutting head (20) which is mounted on an output shaft (22) of the motor. A spool housing (24) with removable housing cover (26) is mounted for rotation with the output shaft (22) and comprises a hub portion (28). A spool assembly (30), which is shown in more detail in FIG. 3, is releasably mounted on the hub portion (28) and comprises a core portion (32) and first and second flange portions (34), (36) spaced apart on the core portion (32). A coiled line member (38) is disposed about the core portion (32) and has a first end (40) secured to the spool (30) and a second end (42) which extends from the coiled line (38) to provide a length of line (12) for cutting. Two apertures (44), (46) through which the line (38) can be threaded are provided in the flange portion (34). The L-shaped aperture (44) is in communication radially with the outside (50) of the flange (34) so that the line (38) can enter the aperture (44) from a position radially exterior of the flange (34). The aperture (46) is in communication with an axial groove (48) formed in the core portion (32) of the spool. The line (38) is coiled with said first end (40) threaded through said aperture (46) from the outside (52) of the spool (30) in a direction substantially parallel to the axis (A) of the spool (30), so that the end (40) is retained within the axial groove (48) of the core portion (32) of the spool (30). The line (38) extends within the groove (48) so that the free end (40) is close to the second flange portion (36). The line (38) is then threaded through the communicating aperture (44) in the direction (X) of winding of the line (38). A resilient sleeve (54) is provided to prevent the filament or strip from uncoiling from the spool.

I claim:

1. A spool for a rotary cutter comprising:

a core portion;

first and second flange portions spaced apart and connected to said core portion;

first and second apertures formed in said first flange portion;

said first aperture being in radial communication with the outside of said first flange;

an axial groove formed in and along the axis of said core portion;

said axial groove being in communication with said second aperture;

a flexible line having first and second ends and disposed about said core portion; and wherein said second end is used for cutting and said first end is secured to the spool by threading through said two apertures, and said first end is held in said axial groove in a position substantially parallel to the axis of said core portion.

2. A spool as claimed in claim 1, wherein said first aperture is substantially "L" shaped.

3. A spool as claimed in claim 2, wherein said "L" shaped aperture is formed such that the base of the "L" extends at approximately right angles to the radius of said spool in the direction in which said line is to be wound.

4. A spool as claimed in claim 1, wherein said two apertures are radially separated.

5. A spool as claimed in claim 1, further comprising a flexible sleeve between said first and second flanges, said sleeve preventing said line from uncoiling from said spool.

6. A spool as claimed in claim 1, wherein said spool is further connected to:

a hub portion on which said spool is releasably mounted;

an output shaft for providing rotation which is connected to said hub portion;

a spool housing rotatably connected to said output shaft; and a removable housing cover connected to said spool housing.

7. A spool for a rotary cutter comprising:

a core portion;

first and second flange portions spaced apart and connected to said core portion;

first and second apertures formed in said first flange portion;

said first aperture being in radial communication with the outside of said first flange;

a flexible line having first and second ends and disposed about said core portion; and wherein said second end is used for cutting and said first end is secured to the spool by threading through said two apertures, and said first end is held in a position substantially parallel to the axis of said core portion.

8. A method of winding a line on a spool, wherein the spool comprises a core having first and second flanges spaced apart and connected to the core, a line having first and second ends, where the second end is used for cutting, at least two apertures spaced radially apart and formed in the first flange, the radially outer aperture being in radial communication with the outside of the first flange:

said method comprising the steps of;

threading said first end of the line through said radially inner aperture from the outside of the spool in a direction substantially parallel to the axis of the spool, such that the line is retained close to the core of the spool;

threading said first end of the line through said radially outer aperture in the direction of the winding of the line; and winding the line about the spool.

9. A method of winding a line on a spool as claimed in claim 8, wherein said aperture which is in radial communication with the outside of said first flange is substantially "L" shaped.

10. A method of winding a line on a spool as claimed in claim 8, wherein the radially outer aperture indicates which direction the line is to be wound.

* * * * *